3,065,264
VAPOR PHASE OXIDATION OF PROPYLENE TO ACRYLIC ACID
Theodore Augur Koch, Glen Mills, Pa., and Ivan Maxwell Robinson and William Lee Wiley, Wilmington, Del., assignors to E. I. du Pont de Nemours and Company, Wilmington, Del., a corporation of Delaware
No Drawing. Filed Dec. 24, 1958, Ser. No. 782,661
2 Claims. (Cl. 260—533)

This invention relates to vapor phase oxidation of propylene to acrylic acid.

Heretofore, it has been known that certain catalysts, such as cobalt boromolybdate and related molybdates are effective in the vapor phase oxidation of butane to maleic anhydride (Hartig, U.S.P. 2,625,519).

It has now been found, in accord with the present invention that these same catalysts are highly efficient in the vapor phase oxidation of propylene to acrylic acid, if water is present as an added component of the feed stream.

The catalysts employed in the practice of this invention comprise molybdenum oxide combined with a basic metal oxide from the group consisting of the oxides of cobalt and nickel, the atomic ratio of the basic metal to molybdenum being less than 1:1.

More specifically, the invention resides in oxidizing propylene in the vapor phase in the presence of a precipitated oxide catalyst comprising molybdenum oxide combined with a basic metal oxide from the group consisting of the oxides of cobalt and nickel, the atomic ratio of the basic metal to molybdenum being less than 1:1, and combined with an acidic promoter from the group consisting of the oxides of boron, phosphorus and vanadium. The atomic ratio of the basic metal to molybdenum is practically limited to at least 0.3:1 due to difficulties in preparation, and it is preferred that the ratio be between 1:1 and 0.5:1. In any event, this ratio must be less than 1:1 and greater than 0.1:1 even if a practical means of preparing the catalyst with a ratio of basic metal to molybdenum of more than 1.1:1 were available. Further, the proportion of acidic promoter should be between 0.1% and 15%, calculated as metal and not as the oxide, by total weight of the whole catalyst.

In a preferred embodiment of the invention the catalyst is a precipitated oxide catalyst essentially consisting of molybdenum oxide combined with an oxide of cobalt, the atomic ratio of cobalt to molybdenum being between 1:1 and 0.3:1, and combined with an oxide of boron, the proportion of the latter, calculated as boron, being between 0.1% and 5%, by weight of the catalyst.

The catalysts of the present invention are generally prepared by precipitating molybdenum in the form of a molybdate with a basic metal in the form of a salt from the group consisting of the salts of cobalt and nickel, precipitation being carried out preferably in an aqueous medium, the atomic ratio of the basic metal to molybdenum in the precipitate being less than 1:1, filtering, drying at an elevated temperature, and thereafter adjusting the physical form of the precipitated catalyst as desired.

In a more specific form the catalysts employed in the practice of the present invention are prepared by precipitating molybdenum in the form of a molybdate with a basic metal in the form of a salt from the group consisting of the salts of cobalt and nickel, precipitation being carried out in an aqueous medium in the presence of an acidic promoter in the form of an acid from the group consisting of the acids of boron, phosphorous, and vanadium, the atomic ratio of the basic metal to molybdenum in the precipitate being less than 1:1, filtering, drying at an elevated temperature, followed by further heating at a more elevated temperature, and thereafter adjusting the particle size of the precipitated catalyst as desired.

In a preferred and still more specific form a particular catalyst for use in the present invention is prepared by precipitating molybdenum in the form of a molybdate with cobalt in the form of a cobalt salt, precipitation being carried out in an acidic aqueous medium in the presence of boric acid, the ratio of cobalt to molybdenum in the precipitate being less than 1:1, and the boron content of the precipitate being between 0.1% and 5% by weight of the total catalyst, filtering, drying at an elevated temperature followed by further heating at a more elevated temperature, and thereafter adjusting the particle size of the precipitated catalyst as desired.

It is to be understood that the catalysts of the present invention are not definite chemical compounds but that all of them, upon analysis, are characterized by having the atomic ratio of the basic metal to molybdenum less than 1:1. Molybdenum combined in some manner with oxygen is the essential component of the type of catalyst embodied herein, and it is in this sense of the word that the term "molybdenum oxide" is used to designate the form in which molybdenum is present in the subject catalysts. Since the chemistry of molybdenum-oxygen compounds is very complex, much of it is still subject to some debate and speculation. In the instant catalysts molybdenum probably occurs in the anion as a molybdate, an isopolymolybdate, or a heteropolymolybdate together with some other acidic constituent such as boron, phosphorus, or vanadium. In referring to the present catalysts as comprising molybdenum oxide combined with a basic metal oxide from the group consisting of the oxides of cobalt and nickel, the general formula $RO \cdot nMoO_3$ may be used to illustrate that which is meant by the term "oxide" as used herein in which R prepresents cobalt or nickel. Depending upon the conditions under which the catalyst is preparted, $n$ may vary from a value greater than 1 to 16 inclusive, it being understood that the atomic ratio of basic metal to molybdenum is to be less than 1:1. Furthermore, it is within the scope of this invention to include catalysts in which the value of $n$ is predominantly 2, 3, or 4 etc., or catalysts which may be composed of a mixture of oxides of the general formula $RO \cdot nMoO_3$ in which the value for $n$ varies for each particular oxide.

Precipitation of the catalyst can be carried out in the presence of heterogeneous catalyst supports, such as silica, alumina, silicon carbide, quartz, and other inert supports or supports capable of chemisorption. The catalyst can also be prepared by impregnation of a support followed by precipitation in situ.

Regardless of the particular structure of the type of catalysts embodied herein, molybdenum combined in some manner with oxygen is the essential component thereof, the function of the molybdenum being to act as the center of oxidation and to promote attack on the material being oxidized.

As briefly discussed hereinbefore, molybdenum alone is not sufficient for the oxidation of propylene, but it is combined in these catalysts with a basic metal oxide from the group consisting of the oxides of cobalt and nickel. The preparation of a satisfactory catalyst may vary widely, but it is necessary that the catalyst be formed in such a manner that the atomic ratio of the basic metal to molybdenum be less than 1:1; broadly, any procedure may be used that will give a precipitated oxide catalyst of the composition hereinbefore set forth. Among the factors that tend to affect the composition of the precipitate and, hence, the combined oxides obtained therefrom, are the chemical nature of the precipitating ions, the pH of the solution, the temperature of the precipitation, the rate of precipitation, the exact method of precipitation, the sequence of addition of precipitating solutions, absolute concentration of the precipitating ions, the relative concentration of the precipitating ions, the filtering and washing techniques, and the methods of drying and heat treatment. These factors may also affect the structure of the combined oxides and, to some degree, even the activity of the catalyst. While precipitation from aqueous medium is ordinarily the most economical and practical, an organic liquid medium may be used. Other methods of preparation, apparent to those versed in the art, can also be employed so long as the catalyst conforms to the specific combination of constituents as set forth.

Although satisfactory catalysts can be made from molybdenum oxide plus a basic metal oxide, it is beneficial to incorporate an acidic promoter with these catalyst compositions, the acidic promoter being preferably selected from the group consisting of the oxides of boron, phosphorous, and vanadium. Included among other promoters which may be used are silicon, tungsten, titanium, beryllium, zirconium, chromium, and uranium. These promoters are added to the precipitating medium and, subsequent to heating the catalyst at an elevated temperature, the promoters will be present in the catalyst in the form of oxides. From about 0.1% to 15% of the boron, phosphorus or vanadium, by weight of the total catalysts, should be present in the catalyst. It is to be understood that these promoters act in different ways and, depending upon the particular acidic promoter employed, addition thereof to the catalyst composition may tend to increase the activity of the catalyst, improve the selectivity of the catalyst with respect to the oxidation of particular organic compounds, control the physical structure of the catalyst or help to control the ratio of basic metal to molybdenum in the process of precipitation of the catalyst.

After precipitation of the catalyst in accordance with the procedure illustrated in the foregoing examples, the catalyst is filtered hot and dried in an oven about 100° C. Thereafter, the catalyst is maintained at a temperature in the range between about 400° C. to 500° C. in a slow stream of air for at least 3 to 4 hours. Depending upon the type of reactor used, that is, a static bed or a fluid bed of catalyst, the precipitated catalyst is ground to the desired size. The catalyst may be as coarse as 1 to 2 mesh (U.S. sieve series) and as fine as 50% through 325 mesh, although the usual range is from 4–100 mesh. Larger particles sizes are used in static bed reactors whereas, the fluid bed reactors require smaller particle sizes.

The oxidation is preferably performed at a temperature of from about 300° to about 500° C. The rate of feed should not be so slow as to give rise to excessive amounts of $CO_2$, but should be slow enough to give rise to the unsaturated acid as one of the main oxidation products. Atmospheric pressures are usually used, and pressures up to about 20 atmospheres, may also be employed.

Halogen acids, halogens, alkyl halides, aryl halides and aralkyl halides act as moderators for the oxidation leading to increased yields of the desired carboxylic acids.

The minimum quantity of water added is somewhat critical for best results, and the quantity needed for optimum yield of acrylic acid is from 0.5:1 to 20:1, in terms of mol ratio of water: propylene. Maximum production of acrylic acid is attained when the mol ratio of water:alkene is at least 3:1. The effluent generally contains at least 0.10% of acrylic or alkacrylic acid by volume.

The invention is illustrated further by means of the following examples.

*Example 1*

A mixture of propylene, oxygen and water preheated to 300° C. is fed continuously in a mol ratio of 1:8:10 to a stainless steel tubular reactor containing 77.2 grams of cobalt boromolybdate catalyst prepared as above-described and composed of cobalt, boron and molybdenum oxides in the mol proportion of 1:0.01:1 (Co:B:Mo). Using a propylene feed rate of 100 cc. per minute (25° C. and one atmosphere), the reaction is carried out at 425° C. using a contact time of 0.44 second. Condensation of the water from the exit stream gives a solution containing acrylic acid. As measured by gas chromatography and titration with base, a conversion of 32% and yield of 42% acrylic acid based on propylene is obtained. A trace amount of acetic acid is also present. The gaseous phase from the condenser contains CO, $CO_2$, $O_2$ and unreacted propylene. Repetition of this example in the absence of added water, using nitrogen as an inert diluent in place of steam, gave only a trace of acrylic acid.

*Example 2*

A mixture of propylene, oxygen and water in a mol ratio of 1:9:11 are fed continuously to a stainless steel tubular reactor containing 77.2 grams of a cobalt boromolybdate catalyst (same as in Example 1) using a propylene feed rate of 60 cc./minute (25° C. and one atmosphere). The reaction is carried out at 425° C. and 0.74 second contact time to give a 41% conversion and 32% yield of acrylic acid in the condensed aqueous phase. Increasing both the oxygen-propylene and water:propylene feed ratios to 15:1 and 19:1 respectively, gives 27% conversion and 48% yield of acrylic acid.

Oxidations over the same catalyst using 1:9:11 propylene:oxygen:water ratios and a propylene feed rate of 100 cc./minute (25° C. and one atmosphere) gives the following total conversion of propylene, and yields of acrylic acid, showing the lower yields at higher temperatures: at 450° C., the conversion is 48%, yield 20%; at 475° C., the conversion is 65%, yield 11%; at 500° C., the conversion is 84%, yield 3%.

*Example 3*

Example 1 is repeated without the boric acid promoter in the catalyst. The reaction occurs in the same manner, but the yield is considerably lower.

*Example 4*

Example 1 is repeated using cobalt phosphomolybdate with results similar to those obtained using cobalt boromolybdate.

*Example 5*

Example 1 is repeated using nickel molybdate promoted with vanadium oxide, in place of corresponding cobalt boromolybdate of Example 1, using the same proportion of basic metal, acidic oxide and molybdenum oxide. The yield of acrylic acid is about the same as in Example 1.

It is to be understood that the foregoing examples are primarily illustrative and that numerous methods of practicing the invention will occur to those who are skilled in the art. Catalysts employing still other oxides, in addition to those specified, may be present, a suitable example of such added oxide being tungsten oxide. If desired, the catalyst may be employed in granular or fluidized bed form.

A wide range of materials of construction may be employed in the reaction vessel, including stainless steel, ordinary steel, etc.

Experiments similar to those reported in these examples were conducted in the absence of added water, with virtually no acrylic acid being formed. This was found to be true when $CO_2$ was used in place of $H_2O$. However, it is to be understood that additives which serve as sources of water (such as formic acid) might be used although this does not appear to be economically desirable.

We claim:

1. Process for preparing acrylic acid which comprises bringing the vapor of propylene, with added water in the proportion of 0.5:1 to 20:1, expressed in terms of the water:propylene mol ratio, in the presence of oxygen, in contact with a precipitated oxide catalyst consisting of molybdenum oxide combined with a basic metal oxide from the group consisting of the oxides of cobalt and nickel, the atomic ratio of basic metal to molybdenum being from 1:1 to 0.5:1, at a temperature of 300° C. to 500° C. and thereafter separating acrylic acid from the effluent gases.

2. Process for preparing acrylic acid which comprises bringing the vapor of propylene with added water in the proportion of 0.5:1 to 20:1, expressed in terms of the water:propylene mol ratio, in the presence of oxygen, in contact with a precipitated oxide catalyst consisting of molybdenum oxide combined with a basic metal oxide from the group consisting of the oxides of cobalt and nickel, the atomic ratio of basic metal to molybdenum being from 1:1 to 0.5:1 said catalyst containing a promoter of the class consisting of the oxides of boron, phosphorus and vanadium, at a temperature of 300° C. to 500° C. and thereafter separating acrylic acid from the effluent gases.

References Cited in the file of this patent

UNITED STATES PATENTS

| | | |
|---|---|---|
| 2,260,409 | Slotterbeck et al. | Oct. 28, 1941 |
| 2,504,034 | Morrell et al. | Apr. 11, 1950 |
| 2,537,568 | Beach | Jan. 9, 1951 |
| 2,625,519 | Hartig | Jan. 13, 1953 |
| 2,649,477 | Jacobs | Aug. 18, 1953 |
| 2,941,007 | Callahan et al. | June 14, 1960 |

FOREIGN PATENTS

| | | |
|---|---|---|
| 397,161 | Great Britain | Aug. 3, 1933 |